Jan. 13, 1970 J. DE WARGA 3,489,957

SEMICONDUCTOR DEVICE IN A SEALED PACKAGE

Filed Sept. 7, 1967

INVENTOR
JANOS de WARGA
BY James and Franklin
ATTORNEYS

United States Patent Office 3,489,957

Patented Jan. 13, 1970

3,489,957
SEMICONDUCTOR DEVICE IN A SEALED PACKAGE

Janos de Warga, New Haven, Conn., assignor to Power Semiconductors, Inc., Devon, Conn., a corporation of Connecticut Filed Sept. 7, 1967, Ser. No. 666,085
Int. Cl. H01l 1/14
U.S. Cl. 317—234 14 Claims

ABSTRACT OF THE DISCLOSURE

A power semiconductor device, typically a silicon controlled rectifier, is in a sealed package made up of upper and lower parts, each of which has a solid cylindrical metal stud, a sheet metal end disc secured to the stud and projecting outwardly therefrom, a ceramic ring having its outer face secured to the outer edge of its adjacent disc, and a metal flange secured to and projecting outwardly from the inner face of the ceramic ring. The said stud, end ring and flange may be brazed to one another without the semiconductor assembly or junction unit being present. After adding the said unit the peripheral portions of the two flanges are secured together by cold welding with the studs bearing against the top and bottom of the semiconductor unit. The studs are of like diameter, disposed coaxially, and massive to provide good electrical and heat conductivity. The ceramic rings are about double the diameter of the studs, so that the end discs have substantial radial dimension and are capable of deflection. The flanges mate so that the upper and lower parts of the package are self centering and are concentrically related during the welding operation. When the device is a silicon controlled rectifier, a control wire lead projects sidewardly from the junction unit, and this is disposed between the flanges and is compressed and welded to the flanges by the same cold welding operation that unites the flanges.

BACKGROUND OF THE INVENTION

Power rectifiers using semiconductor metal, typically silicon or germanium, and including silicon controlled rectifiers, are already known and in wide use, but they are difficult to assemble and manufacture in a hermetically sealed package. Brazing requires heat, and is therefore not desirable in the presence of the semiconductor element. In many cases it is difficult to properly align the parts during assembly. There is also difficulty in providing adequate heat dissipation and good electrical connection. In the case of a silicon controlled rectifier there is the additional problem of providing a third electrical connection for the gating or the control of the device.

SUMMARY OF THE INVENTION

The package is made up of upper and lower parts, each of which has a solid cylindrical metal stud, a sheet metal end disc secured to the stud and projecting outwardly therefrom, a ceramic ring having its outer face secured to the outer edge of its adjacent disc, and a metal flange secured to and projecting outwardly from the inner face of the ceramic ring. The stud, end, ring and flange are brazed to one another without concern over the use of heat, because the upper and lower halves of the package are made without the semiconductor unit being present. After adding the said unit the peripheral portions of the two flanges are secured together by cold welding, at which time the studs respectively bear against the top and bottom of the semiconductor unit. The studs are preferably of like diameter, and are disposed coaxially, and are massive to provide good electrical and heat conductivity.

The diameter of the ceramic rings is much larger, say double the diameter of the studs, so that the end discs have substantial radial dimension and are capable of deflection. The parts are so dimensioned in axial direction that the flanges are spaced apart somewhat prior to cold welding, so that contact pressure is exerted on and by the studs against the semiconductor unit when the flanges are welded together.

The inner portion of one flange is annularly recessed, and the inner portion of the other flange projects annularly and is matingly received in the recess, so that the upper and lower parts of the package are self centering and are concentrically related preliminary to and during the welding operation.

Electrical connection is readily made to the top and bottom faces of the studs. When the device is a silicon controlled rectifier a wire lead projects sidewardly from the semiconductor unit, and this is disposed between the flanges and is compressed and welded to the flanges by the aforesaid cold welding operation, thereby providing the desired third or control connection to the package by way of the flanges.

The foregoing and additional features are described in the following detailed specification, which is accompanied by a drawing in which.

Figures 1, 2, 3, 4, 5:
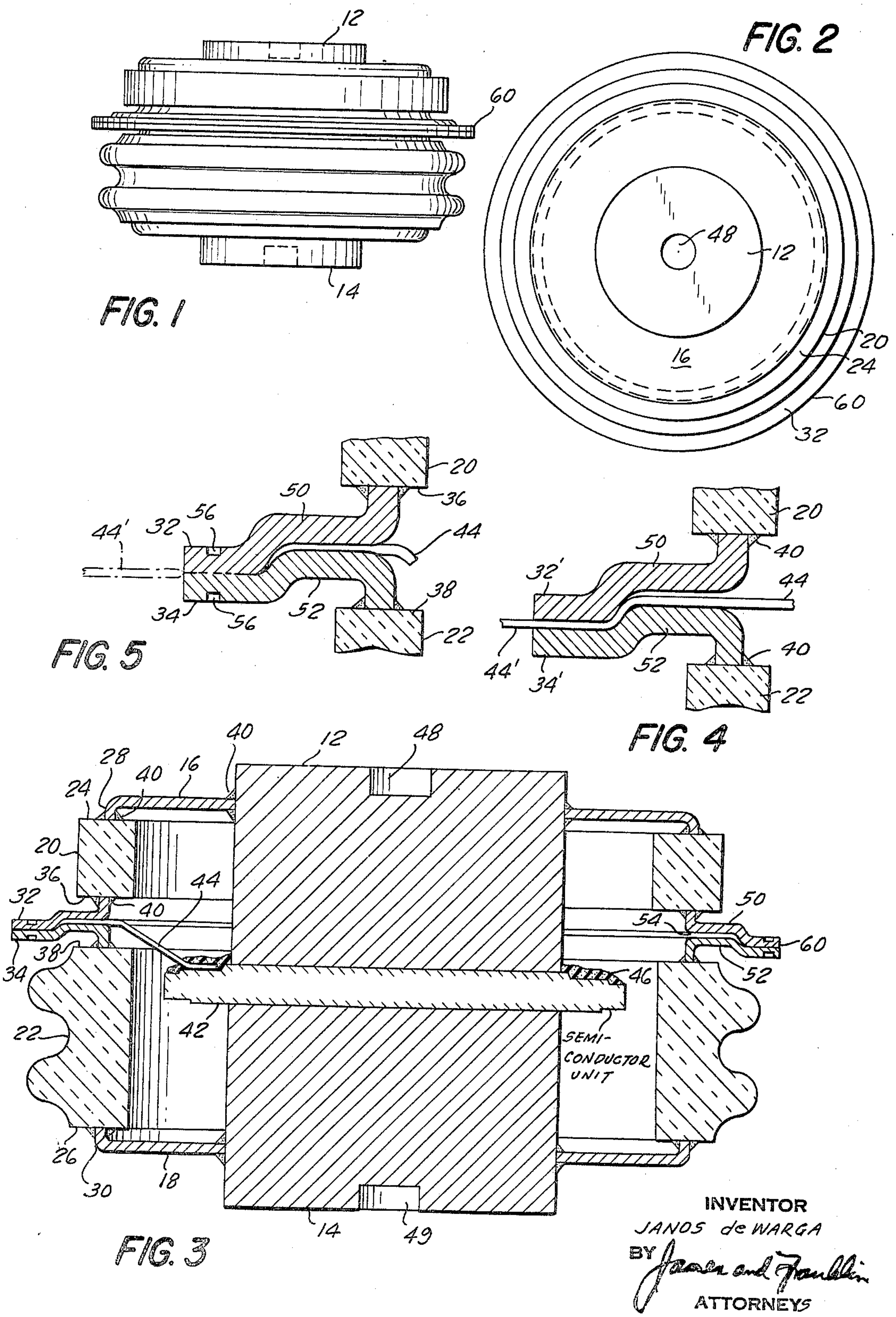
FIG. 1 is an elevation of a power semiconductor device embodying features of the present invention.
FIG. 2 is a plan view of the same.
FIG. 3 is a vertical diametrical section through the same.
FIG. 4 is a fragmentary section showing the relation of the parts prior to cold welding of the flanges.
FIG. 5 is a fragmentary section like FIG. 4, but showing the relation of the parts after the cold welding operation.

Referring to the drawing, the device comprises upper and lower parts each having a solid cylindrical metal stud 12 and 14, sheet metal end discs 16 and 18 secured to studs 12 and 14 and projecting radially outward therefrom, and ceramic rings 20 and 22 having their outer faces 24 and 26 secured to the outer edges 28 and 30 of the adjacent discs 16 and 18. There are sheet metal flanges 32 and 34 secured to and projecting outwardly from the inner faces 36 and 38 of the ceramic rings 20 and 22.

The ceramic rings 20 and 22 are preliminarily metal coated on their end faces. The parts of the upper and lower halves of the package may be effectively secured together by brazing, indicated at 40, and there is no concern over the use of heat, because the semiconductor unit, generally designated 42, is not present during the brazing operation.

No attempt is here made to show the different layers or zones of the semiconductor unit or junction 42 (FIG. 3). It may be a simple rectifier, or it may be more complex for use as a controlled rectifier, in which case a wire lead 44 is connected to an appropriate part of the unit 42, the connection being made near the periphery and extending outward from the unit.

The upper and lower parts of the package are secured together with the unit 42 therebetween. To facilitate the assembly operation, the unit may be preliminarily centered on the stud 12, and secured by the application of silicone rubber peripherally as indicated at 46 in FIG. 3.

In preferred form the studs 12 and 14 are of like diameter, and are disposed coaxially. The end discs 16 and 18 are brazed to the cylindrical studs 12 and 14 at points spaced inwardly somewhat from the outer face ends of the studs, the latter then being available for electrical connection. They may be recessed somewhat as indicated at 48 and 49 to facilitate subsequent positioning of the device in a mounting which usually acts also as a "heat sink" or cooling arrangement.

It will be noted that the diameter of the ceramic rings 20 and 22 is substantially greater, say double, the diameter of the studs 12 and 14. The discs 16 and 18 therefore have substantial radial dimension and are capable of deflection in axial direction without disturbing or breaking the brazed connections 40. The parts of the package are so dimensioned in axial direction that the flanges are initially somewhat spaced apart, as shown at 32', 34' in FIG. 4. The separation in this particular case is about 80 mils. When the flanges are compressed together, a contact force is exerted on and by the studs 12 and 14 against the top and bottom faces of the semiconducdtor unit 42. This is required both for electrical connection and heat dissipation.

The inner portion of one flange, in this case flange 32, is annularly recessed as shown at 50. The inner portion of the other flange 34 projects annularly and is matingly received in the recess 50, as shown at 52. The parts 50 and 52 mate against relative radial movement, but there is clearance in axial direction, even after the welding operation, as will be seen at 54 in FIG. 3. Thus the upper and lower parts of the package are self-centering and are concentrically related during the welding operation.

The welding tool or fixture comprises upper and lower die elements or rings, not shown, which compress the flanges, resulting in the annular indentations or grooves shown at 56 in FIG. 5. In the illustrated structure the flanges have an initial thickness of 20 mils each, but after the welding operation the combined thickness is reduced to 20 mils altogether, that is, the coalesced metal between the bottoms of the indented annular grooves 56 has a total thickness of say 20 mils. The resulting seal is hermetic.

When the device is a silicon controlled rectifier, the present structure has an additional advantage in the ease with which connection is made for control or gating. More specifically, the lead 44 extending outward from the wafer assembly 42 simply rests initially between the spaced flanges, as shown in FIG. 4. The welding operation compresses the lead 44 between the flanges, as shown in FIG. 5, so that the weld at this point is from flange to wire to flange, instead of from flange to flange. After welding, the metals at the weld become integral. The wire 44 is so greatly flattened that the excess projecting lead, indicated at 44' in FIGS. 4 and 5, practically falls away or is readily broken away.

In subsequent use the main electrical connections are made to the studs 12 and 14, while the gating or control connection is made to the flange assembly, generally designated 60.

The ceramic rings 24 and 26 could be alike, but in this case the lower ring 22 is larger, and is finned or fluted to increase its surface dimension. This is done because the voltage between the lower or anode stud 14 and the control flange 60, is greater than the voltage between the upper or cathode stud 12 and the control flange.

As a specific example, the illustrated device is a silicon controlled rectifier capable of 300 amperes DC output. The studs 12 and 14 have a diameter of 0.750 inch, and the end discs 16 and 18 have a diameter of 1.354 inches. The upper ceramic ring has an inside diameter of 1.200 inches and an outside diameter of 1.468 inches. The lower ceramic ring 22 has the same inside diameter of 1.200 inches, and outside diameters of 1.468 and 1.670 inches. The diameter of the flanges is 1.723 inches. The axial dimension of the upper ceramic ring is 0.167 inch, and that of the lower ceramic ring is 0.400 inch. The axial dimension of the parts is such that when the package is assembled there is a spacing between the flanges 32' and 34' (FIG. 4) of about 80 mils. This clearance is eliminated by the cold welding operation, and the resulting stress and flexing of the parts results in a maintained contact force between the studs and the wafer.

The studs 12 and 14, the ends 16 and 18, and the flanges 32 and 34 are preferably made of oxygen-free copper. The ends and flanges have a thickness of 0.020 inch. The ceramic rings are made of 92.5% aluminum oxide. The silicone rubber, indicated at 46, may be that sold by General Electric Company under the trademark "RTV."

The copper parts may be plated with nickel or other suitable metal. The parts are preferably treated in a hydrogen atmosphere at 450° C. for 1 hour. The brazing should be performed without the use of flux.

It will be understood that the foregoing dimensions and materials are given by way of example, and are not intended to be in limitation of the invention.

Use of the same diameter for both studs avoids possible bending stress on the semiconductor unit. The latter may be silicon or germanium, with appropriate doped zones. The illustrated example is silicon.

It is believed that the construction and method of assembly of my improved power semiconductor device, as well as the advantages thereof, will be apparent from the foregoing detailed description. It will also be apparent that while I have shown and described the invention in a preferred form, changes may be made without departing from the scope of the invention, as sought to be defined in the following claims.

I claim:

1. A power semiconductor device in a sealed package, said package comprising upper and lower parts, each part having a solid cylindrical metal stud and a sheet metal end disc secured to said stud and projecting outwardly therefrom, a ceramic ring having its outer face secured to the outed edge of its adjacent disc, a sheet metal flange secured to and projecting outwardly from the inner face of said ceramic ring, at least one of said end discs and said flanges being resiliently deformable, and the other of said end discs and said flanges being resiliently deformable or rigid, and a semiconductor unit having an upper and lower surface spaced from one another by a given distance and positioned between said metal studs, one of said studs operatively engaging said upper surface and the other of said studs operatively engaging said lower surface, the peripheral portion of the flanges on said upper and lower parts being secured together, the nominal spacing of said studs from one another in the absence of said semiconductor unit and with said flanges thus secured to one another and unstressed being less than said given distance, said studs being separated from one another by said semiconductor unit to a distance greater than said given distance, said one of said end discs and flanges being resiliently deformed thereby in a sense such as to force said studs against said unit, said forcing of said studs against said unit comprising substantially the sole force connecting said studs and said unit, thereby providing good electrical and thermal conductivity between said studs and said unit in the substantial absence of bonding material between said studs and said unit.

2. A semiconductor device as defined in claim 1 in which the studs are of like diameter and are disposed coaxially, and in which the flanges are secured together by cold welding.

3. A semiconductor device as defined in claim 2, in which the end discs are brazed to the cylindrical outer walls of the studs at points spaced inwardly somewhat from the outer face ends of the studs.

4. A semiconductor device as defined in claim 3, in which the ends and flanges are large enough in diameter to afford flexing in axial direction.

5. A semiconductor device as defined in claim 4, in which the diameter of the ceramic rings is about double the diameter of the studs, whereby the end discs have substantial radial dimension, and are capable of deflection, and in which the parts are so dimensioned that the flanges are axially spaced somewhat prior to cold welding, so that contact force is exerted on and by the studs against the semiconductor unit after cold welding of the flanges.

6. A semiconductor device as defined in claim 5, in which the inner portion of one flange is annularly recessed, and the inner portion of the other flange projects annularly and is matingly received in said recess, whereby the upper and lower parts of the package are self centering and are concentrically related preliminary to and during the cold welding operation.

7. A semiconductor device as defined in claim 6, in which the semiconductor unit is a silicon controlled rectifier, and has a wire lead projecting sidewardly therefrom, and in which the said lead is disposed between the flanges and is compressed and welded to the flanges by the cold welding operation, to provide a desired third electrical connection to the device by way of the flanges for control of the rectifier.

8. A semiconductor device as defined in claim 1, in which the end discs are brazed to the cylindrical outer walls of the studs at points spaced inwardly somewhat from the outer face ends of the studs.

9. A semiconductor device as defined in claim 1, in which the ends and flanges are large enough in diameter to afford flexing in axial direction.

10. A semiconductor device as defined in claim 1, in which the diameter of the ceramic rings is about double the diameter of the studs, whereby the end discs have substantial radial dimension, and are capable of deflection, and in which the parts are so dimensioned that the flanges are axially spaced somewhat prior to welding so that contact force is exerted on and by the studs against the semiconductor unit after welding of the flanges.

11. A semiconductor device as defined in claim 1, in which the inner portion of one flange is annularly recessed, and the inner portion of the other flange projects annularly and is matingly received in said recess, whereby the upper and lower parts of the package are self centering and are concentrically related preliminary to and during the welding operation.

12. A semiconductor device as defined in claim 1, in which the semiconductor unit is a silicon controlled rectifier, and has a wire lead projecting sidewardly therefrom, and in which the said lead is disposed between the flanges and is compressed and welded to the flanges and the flanges to one another by a cold welding operation, in order to provide a desired third electrical connection to the device by way of the flanges for control of the rectifier.

13. A power semiconductor device in a sealed package, said package comprising upper and lower parts each having a solid cylindrical metal stud, a sheet metal end disc secured to said stud and projecting outwardly therefrom, a ceramic ring having its outer face secured to the outer edge of its adjacent disc, and a sheet metal flange secured to and projecting outwardly from the inner face of said ceramic ring, the peripheral portions of said two flanges being secured together to complete the package, said studs respectively bearing against the top and bottom of the semiconductor unit, and being massive and providing good electrical and heat conductivity, in which the inner portion of one flange is annularly recessed, and the inner portion of the other flange projects annularly and is matingly received in said recess, whereby the upper and lower parts of the package are self-centering and are concentrically related preliminary to and during the securing of said flanges.

14. A semiconductor device as defined in claim 13, in which the semiconductor unit is a silicon controlled rectifier, and has a wire lead projecting sidewardly therefrom, and in which the said lead is disposed between the flanges and is compressed and welded to the flanges by the cold welding operation, to provide a desired third electrical connection to the device by way of the flanges for control of the rectifier.

References Cited

UNITED STATES PATENTS

| | | | |
|---|---|---|---|
| 3,225,416 | 12/1965 | Diebold | 317—234 X |
| 3,238,425 | 3/1966 | Geyer | 317—234 |

FOREIGN PATENTS

| | | |
|---|---|---|
| 662,743 | 4/1965 | Belgium. |
| 1,064,522 | 4/1967 | Great Britain. |
| 1,409,167 | 7/1965 | France. |

JOHN W. HUCKERT, Primary Examiner

R. F. POLISSACK, Assistant Examiner

U.S. Cl. X.R.

174—50.5, 50.58, 52; 317—235